Patented July 29, 1952

2,605,285

UNITED STATES PATENT OFFICE 2,605,285

UREA DERIVATIVES AND THEIR PREPARATION

Everett M. Schultz, Glenolden, Pa., assignor to Sharp & Dohme, Incorporated, Philadelphia, Pa., a corporation of Maryland No Drawing. Application March 23, 1948, Serial No. 16,613

3 Claims. (Cl. 260—534)

This invention concerns the method of preparing certain 1-alkyl-3-omega (substituted carbonyl) alkyl-ureas and the resulting products wherein the 1-alkyl substituent is lower alkyl usually methyl or ethyl and the substituent on the carboxyl group is the 3-omega (substituted carbonyl) alkyl substituent is either the free carboxyl group, the carbamyl group, or a carboxylate group such as a carbalkoxy group or an alkali carboxylate such as an alkali metal or ammonium carboxylate.

As to the method, the invention broadly relates to the preparation of these 1-alkyl-3-omega (substituted carbonyl) alkyl-ureas by esterifying an amino acid with an aliphatic alcohol and then condensing the resulting alkyl ester of the amino acid with a lower aliphatic isocyanate as methyl or ethyl isocyanate. In the case of these 1,3-disubstituted ureas wherein the 3-omega (substituted carbonyl) group is a carbalkoxy group, the aliphatic alcohol selected for use in the esterification is the one which will give the specific alkyl group for the particular carbalkoxy group selected. Accordingly, this particular phase of the method of the invention, and of the related products, is illustrated by, but not restricted to, the following examples:

*Example 1.—1-ethyl-3 - (6-carbethoxyhexyl) - urea.*—In the preparation of this example of one group of the products of the invention, 7-amino-heptanoic acid is esterified with ethyl alcohol to give the resulting ethyl ester which then is condensed with ethyl isocyanate. However, the 7-aminoheptanoic acid, while known, was not readily available and was prepared by the reduction of 6-cyanocaproic acid, a new compound first synthesized by me thus:

(a) *6-cyanocaproic acid.*—71.17 grams (0.37 mol) of 6-bromocaproic acid (M. P. 32° C.) were suspended in 125 cc. of water and converted to its alkali metal carboxylate by adding slowly and with stirring 22.6 grams (0.185 mol) of sodium carbonate at a rate to avoid spewing over due to the carbon dioxide liberated. Then 121 grams (0.409 mol, an excess) of sodium cyanide (96%) were added with shaking. The mixture was then heated to 54° C. when the heating was discontinued and the reaction flask was wrapped in a cloth. Over a period of half an hour, the temperature of the reaction mixture rose to 57° C. The mixture was then heated quickly to 100° C. and boiled for 5 minutes, after which the resulting black, opaque reaction mixture was cooled to 30° C. and acidified with concentrated hydrochloric acid. The free hydrogen cyanide liberated was removed by suction at room temperature. Then the reaction mixture was saturated with ammonium sulfate and the reaction product extracted with ether. The aqueous layer was removed and the ether solution was filtered and dried with anhydrous sodium sulfate. After filtering off the sodium sulfate and evaporating off the ether, there remained an oily residue which on distillation gave a 56% yield of the 6-cyanocaproic acid, a liquid which boiled at 158-160° C. at 2.5-3 m. m. (the identity of this end product was determined by adding the nitrile to potassium hydroxide in ethanol and refluxing and then working up the reaction mixture, obtaining a good yield of pimelic acid identified by its melting point and confirmed by mixed melting point).

(b) *7-aminoheptanoic acid.*—Dry potassium 6-cyanocaproate was first prepared by adding the calculated amount of 40% potassium hydroxide solution to an aqueous suspension of 6-cyanocaproic acid and evaporating off the water in a vacuum desiccator over solid potassium hydroxide. Then 17 grams (0.095 mol) of the dry potassium 6-cyanocaproate were dissolved in 145 cc. of dry methanol containing 16.5 grams of ammonia. The reaction solution was placed in an autoclave with 6 grams of Raney nickel and shaken at 100° C. in an atmosphere of hydrogen at an initial pressure of 1590 lbs. per square inch, and the shaking continued for two hours with a final pressure at 1475 lbs. when the theoretical amount of hydrogen was consumed. The catalyst was filtered off and the methanol was removed by vacuum distillation at 30-50° C. leaving a white pasty residue. This was then dissolved in a minimum amount of water and converted to the free acid by the addition of 6.7 grams of acetic acid, and the aqueous solvent again removed under vacuum at 30-50° C. To the resulting white pasty residue, 10 cc. of dry ethanol were added and the 7-aminoheptanoic acid separated as a white, flocculent solid substance. The amino acid was then filtered off, and washed with absolute alcohol, and recrystallized from the latter as a white solid, melting at 185° C.

(c) The 7-aminoheptanoic acid was converted to its ethyl ester by saturating with hydrogen chloride a suspension of 4.15 grams of 7-amino heptanoic acid in 40 cc. of absolute alcohol and refluxing the mixture for one-half hour. The volatile reagents (the ethanol and hydrogen chloride) were then removed by vacuum distillation at about 35° C. The residue was taken up in a little water, ether was added, and while cooling and shaking, 20% sodium hydroxide was added until the aqueous layer was strongly alkaline. The aqueous layer was withdrawn, and the ether layer was dried with anhydrous sodium sulfate, and after removing the sodium sulfate, was concentrated to 30 cc. and cooled. To the cold solution of the ethyl ester of 7-aminoheptanoic acid there were added slowly three grams (a slight excess) of ethyl isocyanate, and after the addition was completed, the mixture was refluxed for one-half hour. The ether and excess ethyl isocyanate were removed by heating over a steam bath. The resulting residue of 1-ethyl-3-(6-carbethoxyhexyl)-urea was recrystallized from a (1:2) benzene-benzine mixture, from which the product separated in fine, tangled needles melting at 74–75.5° C., a 50% yield.

*Example 2.—1-ethyl-3 - (5 - carbethoxyamyl-urea.*—By replacing the 7-aminoheptanoic acid in Example 1 by 6-aminocaproic acid and following the procedure of the subdivision (c) of Example 1, there was obtained 1-ethyl-3-(5-carbethoxyamyl)-urea in a 60% yield, in needles crystallized from isopropyl ether, melting at 67–68° C.

By replacing the absolute ethyl alcohol in the esterification of each of the omega-amino acids of Examples 1 and 2 by other aliphatic alcohols such as a lower aliphatic alcohol as methyl, propyl, isopropyl, butyl, isobutyl, amyl, isoamyl, hexyl, heptyl, or octyl alcohols, or a higher aliphatic alcohol such as decyl and undecyl or lauryl alcohols, and the like, there are obtained the corresponding 1-ethyl - 3 - carbalkoxyhexyl - ureas, namely, 1-ethyl-3-(6-carbomethoxyhexyl)-urea, 1-ethyl-3-(6-carbopropoxyhexyl)-urea, 1 - ethyl-3-(6-carbisopropoxyhexyl)urea, 1-ethyl - 3 - (6-carbobutoxyhexyl)-urea, 1 - ethyl - 3 - (6 - carbamyloxyhexyl)-urea, 1-ethyl-3-(6-carbisoamyloxyhexyl)-urea, 1 - ethyl - 3 - (6 - carbhexyloxyhexyl)-urea, 1-ethyl-3-(6-carbheptyloxyhexyl)-urea, 1-ethyl-3-(6-carboctyloxyhexyl)-urea, 1-ethyl-3-(6-carbdecyloxyhexyl)-urea, and 1-ethyl-3-(6-carbundecyloxyhexyl)-urea; as well as the corresponding 1-ethyl-3-carbalkoxyamyl-ureas, namely, 1-ethyl-3-(5-carbomethoxyamyl)-urea, 1-ethyl-3-(5-carbopropoxyamyl)-urea, 1 - ethyl-3-(5-carbisopropoxyamyl)-urea, 1-ethyl - 3 - (5-carbobutoxyamyl)-urea, 1-ethyl-3-(5-carbamyloxyamyl)-urea, 1-ethyl - 3 - (5 - carbisoamyloxyamyl)-urea, 1-ethyl - 3 - (5-carbhexyloxyamyl)-urea, 1-ethyl-3-(5 - carbheptyloxyamyl) - urea, 1-ethyl-3-(5-carboctyloxyamyl)-urea, 1-ethyl-3-(5-carbdecyloxyamyl)-urea, and 1-ethyl - 3 - (5-carbundecyloxyamyl)-urea.

Likewise, by replacing the ethylisocyanate in Examples 1 and 2 by methylisocyanate and following the procedure of portion (c) of Example 1, there are obtained the corresponding 1-methyl-3-carbalkoxyalkyl-ureas, namely: 1-methyl-3-(6-carbethoxyhexyl)-urea, 1 - methyl - 3 - (5 - carbethoxyamyl)-urea, 1-methyl-3-(6 - carbomethoxyhexyl)-urea, 1-methyl-3 - (6 - carbopropoxyhexyl)-urea, 1-methyl-3-(6-carbobutoxyhexyl)-urea, 1-methyl-3-(6-carbamyloxyhexyl)-urea, 1-methyl - 3 - (6 - carbisoamyloxyhexyl) - urea, 1-methyl-3-(6-carbhexyloxyhexyl)-urea, 1-methyl-3-(6-carbheptyloxyhexyl)-urea, 1-methyl-3-(6-carboctyloxyhexyl)-urea, 1-methyl - 3 - (6 - carbdecyloxyhexyl)-urea, and 1-methyl-3-(6-carbundecyloxyhexyl)-urea, as well as the corresponding 1-methyl - 3 - carbalkoxyamyl - ureas, namely, 1-methyl-3 - (5 - carbomethoxyamyl) - urea, 1-methyl-3-(5 - carbopropoxyamyl) - urea, 1-methyl-3-(5 - carbisopropoxyamyl) - urea, 1-methyl-3-(5-carbobutoxyamyl)urea, 1-methyl-3-(5-carbamyloxyamyl)-urea, 1-methyl-3-(5-carbisoamyloxyamyl)-urea, 1-methyl - 3 - (5 - carbhexyloxyamyl)-urea, 1-methyl-3-(5-carbheptyloxyamyl)-urea, 1-methyl - 3 - (5 - carboctyloxyamyl)-urea, 1-methyl-3-(5-carbdecyloxyamyl)-urea, and 1-methyl-3-(5-carbundecyloxyamyl)-urea.

The 1,3-disubstituted ureas wherein the 3-omega(substituted carbonyl)alkyl group contains the free carboxyl group, namely, —COOH, are prepared by the fundamental method recited in the first sentence of the third paragraph of this specification, with the addition of a further step involving the saponification of the 1-alkyl-3-omega-carbalkoxyalkyl-ureas obtained as illustrated by Examples 1 and 2 to convert their carbalkoxyalkyl groups to the free carboxyalkyl group.

This extension of the method and the resulting products are illustrated by, but not confined to, the following examples:

*Example 3.—1 - ethyl - 3 - (6 - carboxyhexyl) - urea.*—0.4 gram (0.01 mol) of sodium hydroxide was dissolved in 20 cc. of water and 2 grams (0.0082 mol) of 1-ethyl-3-(6-carbethoxyhexyl)-urea, as obtained in Example 1, were added and the mixture shaken at room temperature for 3 hours. The resulting clear, colorless solution was made faintly acid with dilute hydrochloric acid. After cooling the resulting mixture in a refrigerator, the precipitated white solid was collected by filtration and recrystallized from water, yielding 0.7 gram (30%) of long, frail needles of 1-ethyl-3-(6-carboxyhexyl)-urea melting at 120–121.5° C.

*Example 4.—1 - ethyl - 3 - (5 - carboxyamyl) - urea.*—1-ethyl-3-(5-carbethoxyamyl) - urea was saponified with sodium hydroxide by the same procedure as described in Example 3. The resulting 1-ethyl-3-(5-carboxyamyl)-urea, on recrystallization from water, was obtained in a 74% yield of fluffy needles melting at 117–118° C.

By similarly saponificating other 1-ethyl-3-omega-carbalkoxyalkyl-ureas such as the 1-ethyl-3-omega-carbalkoxyhexyl(or amyl)-ureas as those described following Example 2, there are obtained the corresponding 1-alkyl-3-omega-carboxylalkyl-ureas.

The 1-alkyl-3-omega(substituted carbonyl)alkyl-ureas of the invention in which the 3-omega-(substituted carbonyl)alkyl substitutent is the carbamylalkyl group (i. e. —alkylCONH₂) are likewise prepared by the fundamental method recited in the first sentence of the third paragraph of this specification, with the addition of a further step of treating the 1-alkyl-3-omega-carbalkoxyalkyl-urea, as illustrated by Examples 1 and 2, with ammonia to convert the carboxylate group to the desired carbamido (—CONH₂) or carbamyl group. This particular extension of the method and the resulting products are illustrated by, but not restricted to, the following example:

*Example 5.—1-ethyl-3-(5-carboxamidoamyl) - urea.*—5 grams of 1-ethyl-3-(5-carbethoxyamyl)-urea were shaken with 100 cc. of 15-normal aqueous ammonia for 5 days. The small amount (1.2 grams) of product that remained undissolved was removed by filtration. The filtrate containing the reaction product was evaporated to a small volume on a steam-bath. After cooling in a refrigerator, the syrupy residue yielded 1.2 grams of crystals that were collected by filtration. Both of the 1.2 gram portions of product recrystallized from acetone in a voluminous mass of needles of 1-ethyl-3-(5-carboxamidoamyl)-urea melting at 148.5–149.5° C.

While the process of the invention is particularly effective with alkyl esters of omega-amino acids which react with the alkyl isocyanate, such as ethyl or methyl isocyanate, to yield various examples of the three different types of ultimate products obtainable by working through the fundamental reaction of the invention, the process of the invention may also be carried out with other aliphatic amino acids in which the divalent alkylene group between the amino and the carboxyl groups is branched chain with either the amino group and the carboxyl group both still linked to terminal carbons, as in an aliphatic amino acid of the type

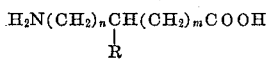

or with either the amino group or the carboxyl group linked to an intermediate carbon of the divalent alkylene radical, as in the aliphatic amino acids represented by the formula

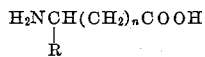

illustrating those with the amino group linked to an intermediate carbon, and of the formula

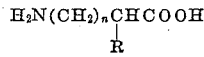

exemplifying those with the carboxyl group linked to an intermediate carbon, and in all of which R is a lower alkyl radical.

The first of the above noted three types of aliphatic amino acids having a branched chain alkylene group is illustrated by alpha-amino-beta-methyl-beta-carboxypropane, delta-methyl-epsilon-amino-n-caproic acid (or 6-amino-5-methylhexanoic acid), and 3-methyl-6-aminohexanoic acid, and the like.

The second group of the branched chain aliphatic amino acids are exemplified by beta-amino pelargonic acid (or 3-amino-nonanoic acid), and the like.

The third type of branched-chain aliphatic amino acids, namely those in which the carboxyl group is linked to an intermediate carbon, is illustrated by 3-carboxy-6-amino-hexane, and the like.

On reacting individual members of all of these various types of branched-chain aliphatic amino acids with ethyl isocyanate in the manner illustrated in Examples 1 or 2, there results the corresponding 1-ethyl-3-omega(substituted carbalkoxyl)alkyl-urea, in which the divalent alkylene group in the substituent on the nitrogen in the 3-position is branched-chain.

If instead of ethyl isocyanate, methyl isocyanate is used, then there results the corresponding 1-methyl-3-omega(substituted carbalkoxyl)alkyl-urea, in which the divalent alkylene group in the substituent on the nitrogen in the 3-position is branched chain.

When the end products described in the preceding paragraph are saponified with alkali hydroxide as sodium hydroxide in the manner described in Examples 3 and 4, there results the corresponding 1-methyl(or ethyl)-3-omega-carboxyalkyl-urea, in which the divalent alkylene radical in the substituent on the nitrogen in the 3-position is branched-chain.

Also, when the 1-alkyl-3-omega-carbalkoxyalkyl-urea, having a branched-chain divalent alkylene radical in the substituent on the nitrogen in the 3-position, is shaken with aqueous ammonia for an extended period in the manner illustrated (in Example 5), there results the corresponding 1-methyl(or ethyl)-3-omega-carbamylalkyl-urea, in which the divalent alkylene radical in the substituent on the nitrogen in the 3-position is branched-chain.

The compounds of the invention have varied application in organic chemistry including application as intermediates in the preparation of other substances.

While the invention has been illustrated by certain specific embodiments of it, it is understood that various alterations or substitutions may be made in it within the scope of the appending claims.

What is claimed is:

1. A 1-alkyl-3-carboxyalkyl urea having the formula

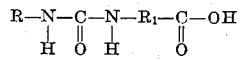

in which R is an alkyl radical selected from the class consisting of ethyl and methyl radicals, R₁ is a divalent alkylene radical selected from the class consisting of alkylene radicals having five and six carbon atoms.

2. A 1-alkyl-3-carboxyalkyl urea having the formula

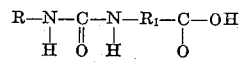

in which R is an alkyl radical selected from the class consisting of ethyl and methyl radicals, R₁ is a divalent alkylene radical selected from the class consisting of straight chain alkylene radicals having five and six carbon atoms.

3. 1-ethyl-3-(6-carboxyhexyl)-urea.

EVERETT M. SCHULTZ.

REFERENCES CITED

The following references are of record in the file of this patent:

Bailey: Berichte 41, 2499 (1908).

Schneipp et al.: Jour. Am. Chem. Soc. 57, 1557–1558 (1935).

Wright: Proc. Soc. Exptl. Biol. Med. 64, 150–153 (Feb. 1947).